United States Patent Office 3,347,899
Patented Oct. 17, 1967

3,347,899
CATALYTIC PROCESS FOR THE PREPARATION OF NITRILES
Giorgio Caporali, Nicola Giordano, and Natale Ferlazzo, Milan, and Quintino Ottaviani, Senago, Milan, Italy, assignors, by mesne assignments, to Montecatini Edison S.p.A., Milan, Italy
No Drawing. Filed Sept. 20, 1963, Ser. No. 310,489
11 Claims. (Cl. 260—465.3)

The present invention relates to a catalytic process for the preparation of nitriles and includes also a series of catalysts particularly suitable for executing said process. More particularly, the invention concerns an improved process for obtaining unsaturated nitriles utilizing catalysts containing a heteropolycompound.

In the technical literature other processes have been described in which an olefine is reacted with ammonia and oxygen in the presence of specific catalysts in order to obtain unsaturated nitriles.

The known catalysts comprise different elements, mainly as combinations of their oxides or in the form of salts for instance: bismuth, tin, and antimony salts of the molybdic, phosphomolybdic and phosphotungstic acids; the oxides of molybdenum, cobalt and tellurium; the oxides of molybdenum and tellurium; the oxides of tungsten and tellurium; the oxide of tellurium; the oxides of molybdenum and chromium; the oxides of molybdenum, arsenic and bismuth; mixtures of the oxides of molybdenum, vanadium, chromium, manganese, cobalt, nickel, copper, iron, tellurium, selenium, bismuth, silver, gold, aluminum etc.; phosphoric acids activated by various elements such as those mentioned above; mixtures of the oxides of bismuth, phosphorus, vanadium, manganese, chromium, iron, cobalt and nickel.

In general, the known processes are not satisfactory in that they exhibit a relatively low selectivity, i.e. a low yield of the desired unsaturated nitrile, coupled with the formation of large amounts of carbon oxides, and undesired by-products, such as unsaturated aldehydes, acids, ketones, saturated nitriles, hydrogen cyanide. These by-products represent obviously a loss of substance, besides making the recovery of the desired unsaturated nitrile in the pure state more difficult.

A further disadvantage of the known processes is, in general, a low conversion for each passage of the fed olefine, wherefore the catalyst has a low productivity so that a recycling of the olefine is required.

Still another disadvantage of the known processes is represented by the side-reactions of the ammonia, which largely occur when using the known catalysts at the operational temperatures. Consequently, in order to obtain good selectivities, the known processes require large amounts of ammonia with respect to the olefine.

Still another disadvantage of the known processes is the relatively long contact time required for obtaining a satisfactory conversion of the olefine fed in.

A further disadvantage is the limited life of the catalysts used in the known processes, which causes frequent substitutions of the deactivated catalyst.

Thus, an object of the present invention consists in providing a process for the production of unsaturated aliphatic nitriles with high yields by reacting an olefine with oxygen and ammonia, without, however, the disadvantages attendant to the known processes.

Another object of the present invention is to provide a process and a catalyst which results in higher yields of unsaturated nitriles than those so far obtainable through this type of reaction.

A further object of this invention is to provide a process and a catalyst which allow a higher conversion for each passage, with relatively short contact times and without reducing the selectivity of the reaction.

Still a further object of this invention is to provide a process and a catalyst with which the maximum possible utilization of the fed ammonia is obtained, avoiding its consumption by side-reactions.

Still another object of this invention is to provide a catalyst so improved that it can be used continuously without any loss of activity, and in consequence thereof it does not require frequent substitutions.

The process according to this invention offers considerable advantages in comparison to the known processes.

A particularly important advantage lies in the high degree of selectivity shown by the catalysts according to this invention. The term "selectivity" is used to mean that side-reactions occur only to a very small extent and that, therefore, only extremely small amounts of by-products and carbon oxides are obtained.

The absence of side reactions, which are highly exothermic in character, makes the thermic control of the process a relatively simple matter, thus avoiding the necessity of particular devices for dissipating the intense reaction heats.

It can easily be perceived how such an advantage results in an operational ease so far unknown in this particular field.

The present invention is directed to a process for obtaining unsaturated nitriles by reacting an olefinic hydrocarbon in the gaseous phase with gaseous ammonia and gaseous oxygen or oxygen containing gases on a catalytic complex which will be described in detail hereinafter, at temperatures ranging from about 300° C. to 600° C. and under substantially atmospheric pressure.

The catalyst according to this invention can be considered as resulting from the salification of a particular heteropolyacid with an element chosen from the group consisting of bismuth and tellurium.

As known, the heteropolyacids are considered to result from two or more molecules of two or more different acids by elimination of water molecules (heterodiacids, heterotriacids, heterotetracids); more particularly they may be considered as formed by the union of a definite number of acid anhydrides molecules, particularly $WO_3$ $MoO_3$ and $V_2O_5$ (usually defined as coordinated elements), with molecules of a second acid that supplies the central atom (usually defined as coordinating element) of said polyanionic complex.

The catalytically active heteropolyacids according to this invention are just the heterotriacids having as coordinating element an element chosen from the group comprising: titanium, zirconium, tin, manganese, cobalt, nickel, chromium, aluminum, iron; and having as coordinated element molybdenum.

Such heteropolyacids are commonly classified in the technical literature depending on the ratio of the number of atoms of the coordinating element to the number of atoms of the coordinated element; the catalytically active heteropolyacids according to the invention correspond to the following formulae:

Series of the hetero-12-molybdic acids:

Titano-molybdic acid, $H_4(TiMo_{12}O_{40})$
   Zircono-molybdic acid, $H_4(ZrMo_{12}O_{40})$
   Stanni-molybdic acid, $H_4(SnMo_{12}O_{40})$ Series of the hetero-9-molybdic acids:

Mangano-molybdic acid, $H_6(MnMo_9O_{32})$
   Cobalto-molybdic acid, $H_6(CoMo_9O_{32})$
   Nickel-molybdic acid, $H_6(NiMo_9O_{32})$ Series of the 2-hetero-12-molybdic acids:

Chromo-molybdic acid, $H_6(Cr_2Mo_{12}O_{42})$
Alumino-molybdic acid, $H_6(Al_2Mo_{12}O_{42})$
Ferri-molybdic acid, $H_6(Fe_2Mo_{12}O_{42})$ In order to obtain catalysts according to the present invention these heteropolyacids (or more exactly heterodiacids) are salified with one of the elements chosen from the group consisting of bismuth and tellurium. The salification is carried out by reacting a compound of the salifying element with the free heteropolyacid or with its ammonium salt.

According to this invention, in the salification of the heteropolyacid or of its ammonium salt, an excess or a deficiency of the compound of the salifying element with respect to the theoretical quantity required may be used. It has surprisingly been found that also the catalysts prepared with an excess or a deficiency of the salifying element are quite effective for executing the process according to the invention.

Thus, the catalyst suitable for operating according to the process of this invention may be conveniently represented by the following formulae:

Class of the hetero-12-molybdates:
$Me_xA_{10}Mo_{120}O_y$
Class of the hetero-9-molybdates:
$Me_xB_{10}Mo_{90}O_z$
Class of the 2-hetero-12-molybdates:
$Me_xC_{20}Mo_{120}O_w$
wherein:

Me represents an atom of an element selected from the group consisting of bismuth and tellurium;
A represents an atom of an element selected from the group consisting of titanium, zirconium and tin;
B represents an atom of an element selected from the group consisting of manganese, cobalt and nickel;
C represents an atom of an element selected from the group consisting of chromium, aluminum and iron;
$x$ represents for all compounds a number comprised between 1 and 180;
$y$, $z$ and $w$ represent numbers that assume particular values according to the class of the heteropolyacid, to the value of $x$ or to the valency of the salifying element Me; particularly $y$ assumes the following values: for the class of the hetero-12-molybdates $y$ is comprised between about 380 and about 740; for the class of the hetero-9-molybdates, $z$ is comprised between about 290 and about 650; for the class of the 2-hetero-12-molybdates $w$ is comprised between 390 and about 750.

The catalytically active heteropolycompounds may be used by themselves as well as mixed with one another.

These heteropolycompounds proved to be effective as such, as well as in admixture with a suitable support. Furthermore, it has been found that they are effective when used in a fixed bed as well as in a fluid bed process.

The process according to the present invention may be used with aliphatic olefines having linear or branched chains, having at least three carbon atoms and at least one methylic group in an alpha-position with respect to the double bond.

The process is particularly effective and gives excellent yields when propylene for obtaining acrylonitrile and isobutene for obtaining methacrylonitrile are used.

The olefines may be used in the pure state. It has been found, however, that the reaction succeeds equally well when the olefine is diluted with paraffinic hydrocarbons which do not react in the process conditions and which behave in all effects as inert diluents.

The oxygen necessary for the reaction may be supplied either in the pure state or in the form of gases containing it, for instance, air. This latter offers some advantages deriving from the nitrogen accompanying the oxygen which serves usefully as a diluent, as will be shown further on.

Because of the exothermic character of the reaction it may be useful or even necessary to dilute the reacting gases with inert gaseous substances. Examples of such substances, whose use was found convenient in the process according to this invention, may be: paraffinic hydrocarbons, for instance those which may be found already mixed with the raw olefine used, nitrogen, carbon dioxide, steam, etc.

As mentioned above, the use of air instead of oxygen in the process, supplies simultaneously nitrogen which acts as an inert diluent. Even the olefine itself acts as an inert diluent when used in excess.

The type, operational procedures, quantity etc. of diluents to be used in the process of this invention depend obviously on different factors; for instance: the reaction conditions; the amount of conversion achieved and, consequently, the amount of heat developed; the selectivity in the sense that where there is a low selectivity the main reaction is accompanied by side-reactions which, being more exothermic in character than the main reaction, require greater quantities of diluent for the thermal control of the process; and at last the technique applied, that is, whether the reaction is effected on a fixed or on a fluid bed as well as the equipment used.

Thanks to the exceptionally high selectivity of the catalysts according to the invention which strongly inhibit the highly exothermic side-reactions, the use of a supplementary diluent in the gaseous mixture fed in may be reduced to very low values, or even altogether omitted, especially when air is used, since the nitrogen present in air in general would be sufficient for controlling the exothermicity of the side-reactions.

The quantity of oxygen or of the gases containing it, used with respect to the quantity of olefine employed may vary within very wide limits.

In the preferred embodiment the molar ratio between the oxygen and the olefine is comprised between about 0.5 and about 2.5. The quantity of ammonia to be used with respect to that of the olefine may vary within wide limits. However, the preferred molar ratio between the ammonia and the olefine lies between about 0.3 and about 2. In order to achieve a maximum of utilization of the ammonia, its quantity should be sufficient at least for completing the reaction; on the other hand, a great excess of ammonia would result in a waste of the ammonia itself.

It has been noted that certain gaseous mixtures of olefine, oxygen and ammonia, characterized by specific ratios of the components may behave as explosive mixtures. However, the process according to this invention is operative also within the limits represented by such explosive mixtures.

The high selectivity of the catalyst, according to the invention allows the maximum possible utilization of the ammonia present in the reaction, so that only a small excess with respect to the reacting olefine is required to insure complete reaction.

While the reaction is generally carried out with excellent results at atmospheric pressure, it can also be carried out at a super-atmospheric pressure.

The process according to the present invention may be carried out at temperatures lying between about 300° C. and about 600° C.; however, temperatures between 400° C. and 550° C. are preferred, for the reason that at these temperatures the reaction rate is so high that very high conversions are achieved even with relatively short contact times, as it will be shown hereinafter and illustrated by the hereto attached examples.

The contact time (expressed as the time during which a volume unit of the fed gaseous mixture, measured under average temperature and pressure conditions existing in the reactor, comes into contact with an apparent volume unit of the catalyst) may vary within wide limits, for instance from 0.05 to 20 seconds, though it has been also found that, thanks to the high activity of the catalyst contact times lower than 1 second are quite sufficient for obtaining a high conversion, so that the preferred contact time range for the carrying out of the process according to the present invention lies between about 0.1 and about 3 seconds.

These heteropolycompounds used as catalysts in the process of the present invention may be obtained in the following way: first, the ammonium salt of the desired heteropolyacid is prepared following the well known procedures described in the literature. This ammonium heteropolysalt is then reacted with a compound of the desired salifying element in a liquid reaction medium and in the presence of a small quantity of strong acid.

The compounds containing the salifying element are, according to the invention, oxides, hydroxides or salts of organic and inorganic acids of the elements bismuth and tellurium, preferably soluble in at least one solvent selected from the class comprising: water, alcohols, esters and ethers.

The two reactants, that is the ammonium heteropolysalt and the compound of the salifying element are reacted in a stoichiometric quantity in order to obtain as reaction product the heteropolysalt of the desired element; it is, however, also possible to use an excess or a deficiency of the compound of the salifying element, with respect to the theoretical value. In any case, the catalysts prepared by using an excess or a deficiency of this reactant are comprised in the limits defined by the previously set out formulae.

The reaction may be effected either between the solutions or between the suspensions in suitable solvents of the two reactants depending on their solubility. The preferred solvent is water; however it is also possible to use other different solvents, such as oxygen containing organic solvents and in particular: alcohols, ethers and esters. The reaction is carried out in the presence of strong mineral acids, and particularly nitric acid.

The conditions under which the reaction is carried out (for instance, temperature, stirring, sequence of addition of the reactants) are not critical for obtaining the catalysts which can be used in the process according to the invention.

According to the present invention it has been found that in the process for the preparation of the catalyst it is possible to replace the ammonium heteropolysalt with the free heteropolyacid which may be prepared according to the procedures known from the technical literature and reported in the given examples.

The above described operational procedures for the preparation of the catalyst starting from ammonium heteropolysalt may be indifferently applied to the preparation of the catalyst starting from the free heteropolyacid.

According to another embodiment it is possible to react the compound of the salifying element with the ammonium heteropolysalt in the same reaction medium in which said ammonium heteropolysalt has been obtained. This embodiment is carried out first by mixing the solution of a salt or of an acid containing the coordinated elements with a solution of an acid or of a salt containing the coordinating element and by subsequently adding to the mixture thus obtained the solution of a compound of the salifying element.

Anyhow obtained, the catalyst may be used either alone, that is without any support, or it may be conveniently deposited on a suitable support.

In case no use should be made of a support, the product of the reaction for preparing the catalyst is evaporated to dryness, for instance by heating it at 110° C. and is subsequently activated by means of heat.

The activation consists in a heating at a temperature between 400° C. and 600° C. for a period of time ranging from 5 to 20 hours. The activation temperature must be equal or superior to the temperature at which the catalyst will be operating in the process for producing nitriles.

The catalyst may be conferred a definite shape and/or size by the usual methods of grinding, sieving, pressing into tablets etc.

Also the well known "spray-drying" technique may be conveniently applied.

Although the catalyst according to the invention may be used without any support, it is preferred to use such supports as they contribute to increase the effectiveness and life of the catalyst itself.

Suitable supports for this purpose may be silica, alumina, Alundum, fireclays or other similar materials, either in the form of powders of suitable granular size, or tablets, pellets, granules and also in the form of gels, such as silica and alumina gel.

Among the supports that proved to be particularly satisfactory are those which present a so-called "open structure" for instance the silica aerogels. The most suitable technique for depositing the catalysts on the supports are well known in the art.

Also the catalyst deposited on a support as well as that without a support, must be activated by heat according to the above mentioned procedures.

During the preparation, as it is known in the art, easily decomposable organic substances may be added such as, for instance, oils, glycerol, polyvinyl acetate, polyvinyl alcohols, which impart through decomposition during the activation stage, a higher degree of porosity to the catalyst.

Some examples will be given hereinafter to illustrate the inventive concept of the present invention.

In the examples, the percentages given for the fed gaseous mixtures are by volume, while the yield percentages are calculated in moles.

The results reported in the examples were determined either through chromatographic analysis, through volumetric and gravimetric quantitative analysis or by gas-volumetric analysis.

*Example 1*

A catalyst based on the bismuth salt of titanomolybdic acid is prepared in the following way: 50 gr. of titanium dioxide, freshly precipitated, is dissolved in warm hydrofluoric acid in a platinum capsule, while adding the stoichiometric quantity of $NH_4F$. Thereupon the solution is slowly evaporated on a water bath. The ammonium fluotitanate crystals thus obtained, are then washed with alcohols until complete disappearance of the fluoride ions. A certain quantity of ammonium fluotitanate (0.1 mole) is then dissolved in a little water slightly acidulated with hydrochloric acid in a platinum capsule and a concentrated solution of ammonium paramolybdate is then added in small amounts. Once a yellow coloring is attained, the whole is acidified with hydrochloric acid. It is then evaporated and left to crystallize. Yellow crystals of the composition $(NH_4)_4(TiMo_{12}O_{40}) \cdot xH_2O$ are thus obtained.

In order to prepare the free acid, the solution of the ammonium salt is passed over a cationic resin of the amberlite I.R. 120 type and the whole is then concentrated and left to crystallize. To 184.4 gr. of the free titanomolybdic acid dissolved in water are added 436 gr. of bismuth-nitrate dissolved in water acidified with nitric acid, as well as 390 gr. of silica aerogel (known under the trade names Aerosil, Cab-O-Sil, Sant-O-Cel). The mass thus obtained is brought to dryness by heating it up to 110° C. and is then calcinated at 540° C. for 12 hours.

The activated catalyst is used in a reactor operating according to the technique of the fluid bed.

At a constant temperature of 470° C. and for a contact time of 0.6 second, a gaseous mixture comprising propylene air, ammonia and steam in the following proportions: 8.2%; 61%; 7.3% and 23.5% respectively, is passed over the catalyst.

It is found that the yield in acrylonitrile with respect to the converted propylene is 84.8% accompanied by 5.9% of acetonitrile and 2.6% of acrolein.

Example 2

A catalyst based on titanomolybdate of bismuth is prepared in the following way:

To 100 gr. of ammonium titanomolybdate obtained as described in Example 1, 229 gr. of bismuth nitrate dissolved in water acidified with nitric acid and 210 gr. of silica aerogel are added. The mass thus obtained is brought to dryness by heating it up to 110° C. and is then calcinated at 540° C. for 12 hours.

After having reduced the catalyst to a suitable size, it is placed in a reactor and gaseous mixture, consisting of 8.4% propylene, 62.5% air, 5.8% ammonia and 23.3% steam is then passed over the catalyst.

The contact time of this mixture with the catalyst is 0.6 second, and the temperature is maintained constant at 503° C.

50.1% of the fed propylene is converted; of this, 80.9% is transformed into acrylonitrile, 4.6% into acetonitrile and 5.4% into acrolein; the carbon oxides amount to only 4.0% of the propylene introduced.

Example 3

Two catalysts marked respectively A and B, based on bismuth zircono-molybdate are obtained as follows:

First of all the ammonium salt of the zircono-molybdic acid, $(NH_4)_4(ZrMo_{12}O_{40})$ or the free zircono-molybdic acid is prepared by operating as described in Example 1, as for the preparation of the corresponding titano-molybdic compounds, that is, by starting with stoichiometric quantities of ammonium paramolybdate and ammonium fluorozirconate, the latter being prepared similarly as the ammonium fluotitanate.

For the catalyst A, to 49 gr. of ammonium zircono-molybdate dissolved in water are added 109 gr. of bismuth nitrate dissolved in water acidified with nitric acid, and then are added 10 gr. of a silica aerogel.

For the catalyst B, to 188 gr. of zircono-molybdic acid a solution acidified with nitric acid of 436 gr. of bismuth nitrate and then 400 gr. of a silica aerogel are added.

In both cases the mass thus obtained is brought to dryness and then activated by heating up at a high temperature as already explained.

The catalysts A and B, after reduction to a size suitable for their use in a fluid bed, are utilized at the conditions and with the results shown hereunder:

| Catalyst | A | B |
|---|---|---|
| Composition of the fed in gaseous mixture in percentage: | | |
| Propylene | 8.3 | 8.2 |
| Air | 62 | 61.8 |
| Ammonia | 5.7 | 6.1 |
| Steam | 24 | 23.9 |
| Reaction temperature in °C | 472 | 499 |
| Contact time in seconds | 0.8 | 0.8 |
| Percent of the feed in propylene which is converted | 65.8 | 74.2 |
| Percentage yield of acrylonitrile with respect to the converted propylene | 69.2 | 71.4 |

Example 4

A gaseous mixture consisting of 4.8% isobutene, 42.5% air, 3.7% ammonia and 49% steam is passed over the catalyst described in the Example 3 and marked B.

At a constant temperature of 420° C. and for a contact time of 1.2 seconds, 55.9% of the fed isobutene is converted and the yield in methacrylonitrile is 51.6% with respect to the converted isobutene.

Example 5

A catalyst based on bismuth stannimolybdate is prepared in the following way: a solution of 1 mole of $(NH_4)_6Mo_7O_{24} \cdot 4H_2O$ and 1 mole of $(NH_4)_2SnCl_6$ is brought to boiling point. Through cooling, a white microcrystalline powder separates whose composition is: $(NH_4)_4(SnMo_{12}O_{40})$, that is ammonium stannimolybdate.

To 106 gr. of this salt dissolved in water a solution of 218 gr. of bismuth nitrate dissolved in acidulated water and 210 gr. of a commercial aerogel are added.

The mass thus obtained is brought to dryness by heating same up to 110° C. and is then calcinated at 540° C. for 12 hrs.

After a suitable subdivision, the catalyst is placed into a reactor and fluidized. A gaseous mixture containing: 8% propylene, 5.8% ammonia, 61% air and 25.2% steam was fed into it at a constant temperature of 494° C. and for a contact time of 0.6 second.

It is found that 62.2% of the fed in propylene is converted, that the yield with respect to the converted propylene is 81.1% for the acrylonitrile; 4.4% for the acetonitrile and 4.2% for the acrolein.

Example 6

A catalyst based on the bismuth salt of the manganomolybdic acid is prepared as follows:

To a solution containing 247.2 gr. of ammonium paramolybdate in 600 cc. of water, 100 cc. of a 0.04 N solution of ammonium permanganate are added and then is added, drop by drop and under stirring a solution of 10.4 gr. of $MnSO_4$ dissolved in 30 cc. of water. Throughout this operation the temperature must be kept at 60° C. On cooling down after concentration orange coloured crystals of mangano-molybdate of ammonium separate, having a composition represented by the formula

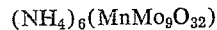

$$(NH_4)_6(MnMo_9O_{32})$$

To 82 gr. of said heteropolysalt dissolved in water a solution acidified with nitric acid containing 218 gr. of bismuth nitrate and 180 gr. of a commercial silica aerogel are added. The mixture thus obtained is brought to dryness and the catalyst mass thus obtained is activated by prolonged heating at 540° C.

After this mass has been crushed and sieved to obtain a powder having the characteristics required for a flowless operation as catalytic fluid bed in a suitable reactor, a gaseous mixture consisting of 8.9% propylene, 66.3% air, 7.1% ammonia and 17.7% steam were passed over said catalytic mass.

With a contact time of about 0.6 second and keeping the temperature constant at 490° C., it will be found that the acrylonitrile produced represents a yield of 84.7% with respect to the converted propylene, the acetonitrile and the acrolein acompanying it representing 3.9% and 4.3% respectively.

Example 7

A catalyst based on bismuth nickel-molybdate is prepared as follows:

To 40 cc. of $NiSO_4$ at 7% are added 200 cc. of a 25% solution of ammonium paramolybdate and 40 cc. of a 30% solution of ammonium peroxy-sulfate. This mixture is brought to boiling point and is maintained there for five minutes. It is then rapidly cooled down and still lukewarm liquid is filtered. Following a further cooling a black crystalline powder separates that has the following composition: $(NH_4)_6(NiMo_9O_{32})$.

To 82.5 gr. of the ammonium salt of the nickel-molybdic heteropolyacid are added an aqueous solution acidified with nitric acid of 218 gr. of bismuth nitrate and 180 gr. of silica aerogel. The whole is then brought to dryness by heating it up to 110° C. and is then calcinated for 12 hours at 540° C.

The catalyst thus activated is then introduced into a reactor that works according to the fluid bed technique and is brought into contact for a period of 0.6 second with gaseous mixture comprising 8.1% propylene, 61% air, 6.5% ammonia and 24.4% steam.

It will be found that at a temperature of 495° C., 50.2% of the fed in propylene is converted, of this latter, 83.4% will be acrynonitrile, 3.7% will be acetonitrile and 4% acrolein.

Example 8

A catalyst based on the bismuth salt of the cobalto-molybdic acid is prepared as follows:

To 124 gr. of the ammonium salt of the cobalto-molybdic acid, obtained by the same procedures as the corresponding nickel-molybdic salt described in Example 7, 327 gr. of bismuth nitrate dissolved in acidulated water and 270 gr. of silica aerogel are added. The whole mass is then brought to dryness by heating it up to 110° C. and then is activated at 540° C. for 12 hours. The catalyst based on bismuth cobalto-molybdate is used in a size suited for operation in fluid beds. A gaseous mixture consisting of 8% propylene, 4% ammonia, 60% air and 28% steam, put into contact with the catalyst for 0.6 second and at a temperature of 512° C. gives place to the formation of acrylonitrile in the proportion of 33.3% with respect to the propylene fed in, together with acetonitrile (1.5%) and acrolein (4%).

Example 9

Catalysts based on the bismuth salt of the chromo-molybdic acid are prepared in the following way:

To an aqueous solution containing 30 gr. of $$(NH_4)_2Cr_2(SO_4)_4 \cdot 24H_2O$$

a solution of 50 gr. of ammonium para-molybdate dissolved in 1000 cc. of water is added. The liquid, brought up to boiling point, takes on a deep pink colour. On cooling it down a pale pink crystalline precipitate is formed. The whole is filtered and dried on phosphoric acid. A powder of the composition $(NH_4)_6(Cr_2Mo_{12}O_{42})$, that is the ammonium salt of the chromo-molybdic acid, is obtained.

Letting the boiling solution of said salt pass over strong acid cationic-exchange resin bed, the corresponding free hetero acid is obtained, which can be then separated in a pure state through concentration and crystallization.

Starting with the free heteropolyacid thus obtained, three catalysts marked C, D and E are prepared, all of them based on the bismuth salt of said heteropolyacid but different from each other, for the quantity of bismuth used in excess with respect to the stoichiometric quantity.

To 230 gr. of the free chromo-molybdic heteropolyacid, dissolved in water, 346.5 gr. of bismuth nitrate dissolved in water, acidified with nitric acid and 390 gr. of a silica aerogel are added for catalyst C; for the catalyst D are added 520 gr. and 470 gr. respectively, for catalyst E 1040 gr. and 720 gr. respectively.

The mass obtained is brought to dryness by heating it up to 110° C. and is then activated maintaining it for 12 hours at 540° C.

The catalysts thus obtained are suitably subdivided and used as fluid beds in the reaction between propylene, air and ammonia in the presence of steam as diluent.

The particular reaction conditions and the results are listed here below:

| Catalyst | C | D | E |
|---|---|---|---|
| Reaction temperature in ° C | 458 | 482 | 503 |
| Contact time in seconds | 0.6 | 0.8 | 0.6 |
| Composition of gaseous input mixture in percent: | | | |
| Propylene | 8.3 | 8.2 | 8.3 |
| Air | 62.5 | 62 | 62 |
| Ammonia | 4.1 | 5.8 | 5.7 |
| Steam | 25.1 | 24 | 24 |
| Yield with respect to the propylene consumed, percent: | | | |
| Acrylonitrile | 80.5 | 80.2 | 79 |
| Acetonitrile | 5.6 | 4.9 | 3.3 |
| Acrolein | 2.4 | 4.9 | 5.5 |
| Percentage of the fed in propylene converted | 37.2 | 51.4 | 48.4 |

Example 10

A catalyst based on bismuth chromo-molybdate is prepared in the following way:

To a warm aqueous solution of 120 gr. of the ammonium salt of the chromo-molybdic acid, prepared as described in Example No. 9 are added an acid aqueous solution of 257.5 gr. of bismuth nitrate and 235 gr. of a silica aerogel.

The mixture thus obtained is spray-dried, thereby directly obtaining solid particles of dimensions suited for working as a fluid bed. After activation by prolonged heating at 550° C., the catalyst is placed into a reactor and a gaseous mixture composed of 8.8% propylene, 66.1% air; 7.5% ammonia and 17.6% steam is passed over it at a temperature of 482° C.

Acrylonitrile with a yield of 84.1% with respect to the converted propylene is obtained, while, at the same time, acetonitrile for 4.8% and acrolein for 3.2% are formed.

Example 11

A catalyst based on the tellurium salt of the chromo-molybdic acid is prepared in the following way:

A warm aqueous solution of 100 gr. of ammonium salt of the chromo-molybdic acid, obtained as described in Example No. 9 is prepared and then is mixed with a solution obtained through the attack of nitric acid on 9.2 gr. of metallic tellurium; to the resulting mixture are then added 100 gr. of a silica aerogel.

The whole is then brought to dryness by heating up to 110° C. and then the heating is carried on for 12 hours at 500° C. in order to activate the catalyst.

This catalyst, used according to the fluid bed technique, ensures a yield of 77.7% of acrylonitrile with respect to the total propylene converted, when the catalyst is brought into contact at 448° C. with a gaseous mixture consisting of 8.2% propylene, 61.5% air, 5.7% ammonia and 24.6% steam.

Example 12

A catalyst based on bismuth alumino-molybdate is prepared in the following way:

100 gr. of $(NH_4)_6Mo_7O_{24} \cdot 4H_2O$ and 72 gr. of $$Al(NO_3)_3 \cdot 9H_2O$$

are dissolved in 1500 cc. of $H_2O$. The solution is then brought to boiling point for several minutes and then left to cool down. Through the cooling white crystals separate, which are then filtered and washed. These crystals are formed by the ammonium salt of alumino-molybdic acid $H_6(Al_2Mo_{12}O_{42})$. By passing a warm solution of said salt over an ion-exchange resin the free acid is obtained.

In order to obtain the bismuth heteropolysalt, a solution containing 218 gr. of bismuth nitrate and 40 gr. of commercial silica aerogel are added to 116 gr. of ammonium alumino-molybdate in solution. The mass thus obtained is brought to dryness by heating it at 110° C. and is then calcinated for 12 hours at 540 gr.

After breaking down the mass to the desired size the catalyst is brought into contact for 0.6 second with a gaseous mixture consisting of 8.9% propylene, 66.9% air, 6.3% ammonia and 17.9% steam.

At the temperature of 430° C. acrylonitrile is obtained at a proportion of 62.1% of the reacted propylene.

Example 13

A catalyst based on the bismuth salt of the ferri-molybdic acid is prepared in the following way:

30 gr. of ammonium paramolybdate are dissolved in 600 cc. of water. The solution is then first heated up to 45° C. and then drop by drop, a half saturated ferric ammonium sulfate solution is added to it while stirring at such rate that the precipitate forming during this operation, immediately dissolves again.

After adding 15 cc. of ferric solution, a crystalline precipitate of composition: $(NH_4)_6(Fe_2Mo_{12}O_{42})$ of ammonium ferri-molybdate starts separating. In case it is desired to obtain the corresponding free heteropolyacid, one operates according to Example No. 12.

To 80 gr. of the ammonium salt of the ferri-molybdic acid are then added 146 gr. of bismuth nitrate and 67 gr. of aerogel. The whole is then brought to dryness by heating up to 110° C. and then activated for 8 hours at 500° C.

The catalyst thus obtained is then suitably subdivided and used as a fluid bed in a reactor in which a gaseous mixture is made to pass which is composed of 8.3% propylene, 62.0% air, 5.7% ammonia and 24.0% steam. At a temperature of 468° C., 58% of the fed in propylene is converted and the yield in acrylonitrile is 72.6% with respect to the converted propylene, while the yield of the acetonitrile is 3.1% and that of the acrolein 4.7%.

With a gaseous mixture slightly richer in ammonia, it will be found that at 481° C., 62% of the propylene reacts and that 76.7% of it is transformed into acrylonitrile.

We claim:
1. A process for converting propylene or isobutylene to acrylonitrile or methacrylonitrile, respectively, comprising contacting a mixture of said propylene or isobutylene, ammonia and a gas containing elemental oxygen at a temperature in the range of 300°–600° C. and contact time in the range of 0.05–20 seconds with a catalyst having a formula selected from the group consisting of:

$$Me_xA_{10}Mo_{120}O_y$$
and
$$Me_xB_{10}Mo_{90}O_z$$

in which Me represents an atom of an element selected from the group consisting of bismuth and tellurium; A represents an atom chosen from the group consisting of titanium, zirconium and tin; B represents an atom of an element selected from the group consisting of manganese, cobalt and nickel; $x$ represents a number between 1 and 180; $y$ represents a number between about 380 and 740 and $z$ represents a number between about 290 and 650.

2. A process according to claim 1, wherein the catalyst has the formula:

$$Me_xA_{10}Mo_{120}O_y$$

3. A process according to claim 2 in which, before use, the catalyst is activated by a heat treatment at a temperature between 400° C. and 600° C. and for a time between 5 and 20 hours.

4. A process according to claim 2 in which before heat treatment there is added an organic substance selected from the group consisting of oils, glycerol, polyvinyl acetate, polyvinyl alcohol, which during the heat treatment decomposes and thereby improves the porosity of the catalyst.

5. A process according to claim 2, in which the catalyst is admixed with a support.

6. A process according to claim 5, in which the support is silica aerogel.

7. A process according to claim 1 in which the catalyst has the formula:

$$Me_xB_{10}Mo_{90}O_z$$

8. A process according to claim 7, in which, before use, the catalyst is activated by a heat treatment at a temperature between 400° C. and 600° C. and for a time between 5 and 20 hours.

9. A process according to claim 7, in which before heat treatment there is added an organic substance selected from the group consisting of oils, glycerol, polyvinyl acetate, polyvinyl alcohol, which during the heat treatment decomposes and thereby improves the porosity of the catalyst.

10. A process according to claim 7, in which the catalyst is admixed with a support.

11. A process according to claim 10, in which the support is silica aerogel.

References Cited

UNITED STATES PATENTS

| | | | |
|---|---|---|---|
| 2,292,632 | 8/1942 | Greger | 252—455 |
| 2,326,523 | 8/1943 | Connolly et al. | 252—455 |
| 2,553,008 | 5/1951 | Sager | 260—465.3 |
| 2,621,204 | 12/1952 | MacLean et al. | 260—465.3 |
| 3,161,670 | 12/1964 | Adams et al. | 260—465.3 |
| 3,164,626 | 1/1965 | Minekawa et al. | 260—465.3 |
| 3,164,628 | 1/1965 | Minekawa et al. | 260—465.3 |
| 3,173,957 | 3/1965 | McDaniel et al. | 260—465.3 X |
| 3,253,014 | 5/1966 | McDaniel et al. | 260—465.3 |

JOSEPH P. BRUST, *Primary Examiner.*

CHARLES B. PARKER, *Examiner.*

UNITED STATES PATENT OFFICE

CERTIFICATE OF CORRECTION

Patent No. 3,347,899　　　　　　　　　　　　　　October 17, 1967

Giorgio Caporali et al.

It is hereby certified that error appears in the above numbered patent requiring correction and that the said Letters Patent should read as corrected below.

In the heading to the printed specification, after line 8, insert -- Claims priority, application Italy Sept. 20, 1962, 18517/62 --.

Signed and sealed this 19th day of November 1968.

(SEAL)
Attest:

Edward M. Fletcher, Jr.　　　　　　　　　　　　　EDWARD J. BRENNER
Attesting Officer　　　　　　　　　　　　　　　　 Commissioner of Patents